United States Patent [19]

Vaughan

[11] Patent Number: 5,050,121

[45] Date of Patent: Sep. 17, 1991

[54] COMMUNICATION SYSTEM WHICH USES CHARACTERS THAT REPRESENT BINARY-CODED DECIMAL NUMBERS

[76] Inventor: H. W. Vaughan, 4136 Courtshire Dr., Dallas, Tex. 75229

[21] Appl. No.: 467,965

[22] Filed: Jan. 22, 1990

[51] Int. Cl.$^5$ .................. G06F 15/38; G06G 7/60
[52] U.S. Cl. .................. 364/900; 364/920.4; 364/942.8; 364/948.2; 364/943; 364/419
[58] Field of Search ............ 341/78, 84, 85, 62, 341/64, 88, 90; 235/454, 462; 382/11, 13, 18, 23; 364/419, 200 MS File, 900 MS File, 419

[56] References Cited

U.S. PATENT DOCUMENTS

| | | | |
|---|---|---|---|
| Re. 26,607 | 6/1969 | Spaulding | 341/62 |
| 4,545,032 | 10/1985 | Mak | 341/90 |
| 4,661,073 | 6/1985 | Smart | 434/222 |
| 4,864,503 | 9/1989 | Tolin | 364/419 |
| 4,866,445 | 9/1989 | Valero et al. | 341/106 |
| 4,868,750 | 9/1989 | Kucera et al. | 364/419 |

Primary Examiner—Gareth D. Shaw
Assistant Examiner—Kevin A. Kriess

[57] ABSTRACT

A computer system which creates many styles of character sets whose characters represent either a group of five-bit or a group of eight-bit binary-coded decimal numbers. The character sets are used for common communication, other than handwriting, by people or machines, in any sensible medium. Having interchangeable eight-bit and five-bit character sets provides transparent interface between communication for people, and communication for technical and machine purposes. The purpose of this system is to create a single character set which will express all of the languages of the world. The system is comprised of three primary processes: designing, coding, and formatting the binary-coded decimal characters. When supplied with cleartext information, the system converts the information and expresses it with the created character set, in any sensible medium. It converts each character of the cleartext information to the corresponding character of the created character set. The invention provides a default mode to be operated as is, using preset programmed parametric and switch settings and a sample of clear text, to demonstrate typical operation and invite practice and extension to its full capability.

7 Claims, 8 Drawing Sheets

FIGURE 2.

Mary had a little lamb.

It's fleece was white as snow, and everywhere that Mary went, the lamb was sure to go.

from The Declaration of Independence

-We hold these truths to be self evident, that all men are created equal, that they are endowed by their Creator with certain unalienable Rights,

abcdefghijklmnopqrstuvwxyz

ABCDEFGHIJKLMNOPQRSTUVWXYZ

1234567890 +-=*,. "'?!$:;&

Mary had a little lamb.

FIGURE 6.

| LOWERCASE LETTERS ||||
|---|---|---|---|
| CHAR | DEC CODE | BINARY CODE | DISPLAY MODE CODE |
|   | 0  | 0     | L 0     |
| a | 1  | 1     | L 1     |
| b | 2  | 10    | L 10    |
| c | 3  | 11    | L 11    |
| d | 4  | 100   | L 100   |
| e | 5  | 101   | L 101   |
| f | 6  | 110   | L 110   |
| g | 7  | 111   | L 111   |
| h | 8  | 1000  | L 1000  |
| i | 9  | 1001  | L 1001  |
| j | 10 | 1010  | L 1010  |
| k | 11 | 1011  | L 1011  |
| l | 12 | 1100  | L 1100  |
| m | 13 | 1101  | L 1101  |
| n | 14 | 1110  | L 1110  |
| o | 15 | 1111  | L 1111  |
| p | 16 | 10000 | L 10000 |
| q | 17 | 10001 | L 10001 |
| r | 18 | 10010 | L 10010 |
| s | 19 | 10011 | L 10011 |
| t | 20 | 10100 | L 10100 |
| u | 21 | 10101 | L 10101 |
| v | 22 | 10110 | L 10110 |
| w | 23 | 10111 | L 10111 |
| x | 24 | 11000 | L 11000 |
| y | 25 | 11001 | L 11001 |
| z | 26 | 11010 | L 11010 |
|   | 27 | 11011 | L 11011 |
|   | 28 | 11100 | L 11100 |
|   | 29 | 11101 | L 11101 |
|   | 30 | 11110 | L 11110 |
|   | 31 | 11111 | L 11111 |

| CAPITAL LETTERS ||||
|---|---|---|---|
| CHAR | DEC CODE | BINARY CODE | DISPLAY MODE CODE |
|   | 32 | 100000 | C       |
| A | 33 | 100001 | C 1     |
| B | 34 | 100010 | C 10    |
| C | 35 | 100011 | C 11    |
| D | 36 | 100100 | C 100   |
| E | 37 | 100101 | C 101   |
| F | 38 | 100110 | C 110   |
| G | 39 | 100111 | C 111   |
| H | 40 | 101000 | C 1000  |
| I | 41 | 101001 | C 1001  |
| J | 42 | 101010 | C 1010  |
| K | 43 | 101011 | C 1011  |
| L | 44 | 101100 | C 1100  |
| M | 45 | 101101 | C 1101  |
| N | 46 | 101110 | C 1110  |
| O | 47 | 101111 | C 1111  |
| P | 48 | 110000 | C 10000 |
| Q | 49 | 110001 | C 10001 |
| R | 50 | 110010 | C 10010 |
| S | 51 | 110011 | C 10011 |
| T | 52 | 110100 | C 10100 |
| U | 53 | 110101 | C 10101 |
| V | 54 | 110110 | C 10110 |
| W | 55 | 110111 | C 10111 |
| X | 56 | 111000 | C 11000 |
| Y | 57 | 111001 | C 11001 |
| Z | 58 | 111010 | C 11010 |
|   | 59 | 111011 | C 11011 |
|   | 60 | 111100 | C 11100 |
|   | 61 | 111101 | C 11101 |
|   | 62 | 111110 | C 11110 |
|   | 63 | 111111 | C 11111 |

| NUMBERS AND SPECIAL CHARACTERS ||||
|---|---|---|---|
| CHAR | DEC CODE | BINARY CODE | DISPLAY MODE CODE |
| 0 | 64 | 1000000 | N 00    |
| 1 | 65 | 1000001 | N 1     |
| 2 | 66 | 1000010 | N 10    |
| 3 | 67 | 1000011 | N 11    |
| 4 | 68 | 1000100 | N 100   |
| 5 | 69 | 1000101 | N 101   |
| 6 | 70 | 1000110 | N 110   |
| 7 | 71 | 1000111 | N 111   |
| 8 | 72 | 1001000 | N 1000  |
| 9 | 73 | 1001001 | N 1001  |
| + | 74 | 1001010 | S 1010  |
| - | 75 | 1001011 | S 1011  |
| = | 76 | 1001100 | S 1100  |
| * | 77 | 1001101 | S 1101  |
|   | 78 | 1001110 | S 1110  |
|   | 79 | 1001111 | S 1111  |
|   | 80 | 1010000 | S 10000 |
| . | 81 | 1010001 | S 10001 |
| , | 82 | 1010010 | S 10010 |
| ; | 83 | 1010011 | S 10011 |
| ! | 84 | 1010100 | S 10100 |
|   | 85 | 1010101 | S 10101 |
| : | 86 | 1010110 | S 10110 |
|   | 87 | 1010111 | S 10111 |
| $ | 88 | 1011000 | S 11000 |
| & | 89 | 1011001 | S 11001 |
|   | 90 | 1011010 | S 11010 |
|   | 91 | 1011011 | S 11011 |
| * | 92 | 1011100 | S 11100 |
| ' | 93 | 1011101 | S 11101 |
|   | 94 | 1011110 | S 11110 |
| ? | 95 | 1011111 | S 11111 |

FIGURE 7.

|  |  |  |
|---|---|---|
| ▭ | — | BIT - 4 DECIMAL VALUE 8 |
| ▭ | — | BIT - 3 DECIMAL VALUE 4 |
| ▭ | — | BIT - 2 DECIMAL VALUE 2 |
| ▭ | — | BIT - 1 DECIMAL VALUE 1 |

REFERENCE LOCATION

| ▭ | — | BIT - 5 DECIMAL VALUE 16 |
| ▭ | — | BIT - 6 DECIMAL VALUE 32 |
| ▭ | — | BIT - 7 DECIMAL VALUE 64 |
| ▭ | — | BIT - 8 DECIMAL VALUE 128 |

FIGURE 8.

| ▭ | — | BIT - 3 | VALUE 4 |
| ▪ | — | DOT - 2 | VALUE 0 |
| ▭ | — | BIT - 1 | VALUE 1 |
|   |   | TOTAL VALUE | 5 |

FIGURE 9.

| ▭ | — | BIT - 3 | VALUE 4 |
| ▪ | — | DOT - 2 | 0 |
| ▭ | — | BIT - 1 | 1 |
| ▭ | — | BIT - 5 | 16 |
|   |   | TOTAL VALUE | 21 |

FIGURE 10.
FOR MODE-L
- LOWERCASE LETTERS
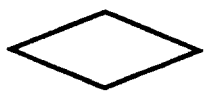
FOR MODES-N & -S
- NUMBERS
- SPECIAL CHARACTERS
FOR MODE-C
- CAPITAL LETTERS
FIGURE 11.
|  | MODES-L | MODES-N & -S | MODES-C |
|---|---|---|---|
| SET A |  |  |  |
| SET B |  |  |  |
| SET C |  |  |  |
| SET D |  |  |  |

FIGURE 12.
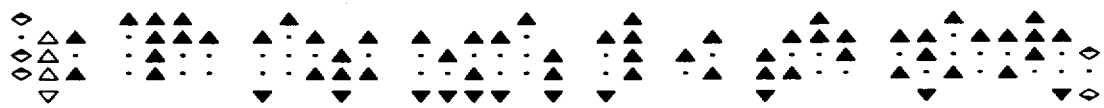
FIGURE 13.
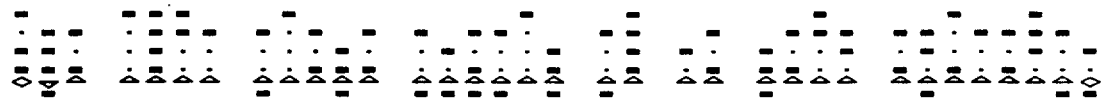
FIGURE 14.
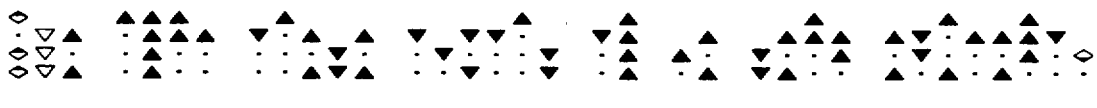

abcdefghijklmnopqrstuvwxyz   ABCDEFGHIJKLMNOPQRSTUVWXYZ   0123456789   +-=*.,!;:S&"'?

COMMUNICATION SYSTEM WHICH USES CHARACTERS THAT REPRESENT BINARY-CODED DECIMAL NUMBERS

The acronym, BYTSC, pronounced BYTEsky, meaning BYTe-Structured Characters, is an adjective created to describe this system of BCD (binary-coded decimal) characters and the components of the system.

FIELD OF INVENTION

This invention relates to information expressed as characters, except personal handwriting; such information may be expressed in any medium sensible by people or machines.

BACKGROUND—RELATED APPLICATIONS—NONE

SUMMARY OF THE INVENTION

The BYTSC System creates a novel set of BCD characters including alphabets, numbers and other characters required by an information system. The system will produce an unlimited number of styles, sizes and other variations of its BCD characters. Any alphabet can be represented by BYTSC characters. Text can be produced by the system in the language of that alphabet using the BYTSC characters. BYTSC characters and text can be expressed in all media, such as graphic, tactile or sound.

FIGS. 2, 3 and 4, Sheet 2, illustrate typical BYTSC text in multiple styles. The character sets were created and the samples produced by this system. They are expressed as printing in the BYTSC text format.

The style of FIG. 2 is referred to as Workbook because its width and spacing allow translation to be displayed below the text. For the sample, a cleartext translation is printed below each character and word of the BCD text.

Classes of characters such as lowercase, capitals, numbers and punctuation are recognizable by associating them with equivalent characters in the cleartext. All characters have a similar format but are differentiated by their combinations of bit-symbols, the rectangles and diamonds, and the reference-symbol, the line.

The style of letters used in FIG. 2 is based on using rectangular bits. Bits for the capital letters are enhanced with heavy outlines. The punctuations and numbers share a single diamond shaped bit-symbol. The page number 31, lower right, is distinguished by having no reference-symbol.

BACKGROUND—DESCRIPTION OF PRIOR ART

Introduction: Heretofore, the communication systems of the world are as diverse as the languages which they express:

their characters, primarily alphabetic or iconographic, used by large populations, are quite different. Their extremes of differences, for alphabetic expression, are briefly illustrated by the following reference: Alphabet Table, Webster's New Collegiate Dictionary, page 32, 1980 printing.

languages may be expressed in multiple different character sets. For example, English is expressed in the Roman alphabet, Braille, Morse Code, various computer character sets, bar codes and others. The production elements of their communication systems are as diverse as their character sets.

Those diversities, and the complexities of the language systems, are increasing.

Volumes of basic communication in the world are increasing between regions and peoples. Communications between machines are increasing rapidly. Communications between and within computers is a large part of this. These activities create urgent pressures for a single compatible character set and associated communication system.

This situation is comparable to the need for universal standards for measurement prior to metric standards. The need for a universal alphabet is equally pervasive. The obstacles to the alphabet need are generally the same as they were with respect to the metric standards: no culture wanted to surrender its own standards; the conversion to common standards required taking from each local society the use of their effective, familiar standards, and replacing them with new, unfamiliar standards; an implementing device or mechanism had to be widely available.

The BYTSC System of communication relies on the same primary devices which have led to near-universal acceptance of the metric measurements: it is based on a rational structure of basic arithmetic; this foundation appeals as an intellectual challenge and is essentially free of nationalistic or ethnic prejudice. It is new to all; it requires no arbitrary selection of existing means. Its program can be operated with widely available computer systems.

Within any communication system, the characters used to express words and word sounds generally fall into one of two types:

Alphabetic character sets use relatively few characters, that is, letters. Each letter represents one sound or several sounds discriminated by context. The letters are combined to represent all of the words and sounds of a language. The 26 letters of the Roman alphabet express most of the sounds of several common languages such as English. Some sounds require more than one letter to express. The German language, and others, add modified letters to the Roman character set to express their sounds. Still other languages, such as Greek and Russian, use their own unique alphabets to represent their words.

Ideographic or iconographic character sets, such as those used to express the Chinese and Japanese languages, use extremely large character sets. Japanese uses more than 10,000 different characters for full expression and about 2500 characters for basic expression. These languages increasingly supplement their characters with a phonetic alphabet and Arabian numbers for technical and other expressions. Japanese is an example.

The Arabian number characters are in common use as a part of many character sets.

Thus, current popular character-based communication systems in wide use, both alphabetic and ideographic, have major disadvantages. Their characters are relatively complex. Additionally, their characters are based on widely diverse concepts and formats. This applies both to alphabetic and ideographic systems. This complexity exists without regard to whether the characters are basically geometric or script-like.

System origins—although people have used writing for about 5000 years, the Western World had no effective mechanical system for reproducing writing until about 1450. Movable type for printing was introduced at that time.

That printing system had the four essential operating elements which continue to typify modern communication systems:
1. Machinery and supplies—the printing press, using movable type, and paper
2. Software—the system required standardized usages, methods and procedures comparable to software
3. Code—by stabilizing character designs, the characters represented a standard code for expressing sounds, words and ideas
4. Standard formats—printed information became popularly available and motivated uniform layouts for expression and punctuation The mechanical system reduced some of the previous freedom and opportunities for style expression but revolutionized the opportunities for wide distribution and increased literacy.

Moving to the Industrial Revolution, Samuel Morse's initial patent for the telegraphic communication system was U.S. Pat. No. 1647, dated June 1840. It uses the same four system elements. His machine and software elements were novel and advanced for the then state of the art. Morse's codes for characters mapped conventional Roman letter and Arabic number symbols. He adapted his formats to his electric and print media.

The disadvantages of the telegraph system typify many other communication systems. The telegraph system added a new, different character set to express conventional Roman alphabet, Arabic numbers and special characters and words. While its characters are expressed graphically, audibly, and electrically, the system is difficult to learn and use. It was designed for and limited to telegraphic code.

The Braille System, referred to as Braille Code, is primarily sensed tactilely. It bears little relation to any common alphabet, numbers or other characters. It has been a valuable system since no better is available. It is difficult to learn and only about one of every ten blind people can read Braille. Its unique, difficult character set impedes sighted people teaching the characters to the blind. Even people who know they are going blind often give up learning Braille because they lack any bridge of familiarity to conventional characters.

Bar Code Systems are not commonly used for general communication. The several systems are too complex to be read fluently by people. If sight reading is required, the information is repeated in cleartext.

Bar codes express information as a short printed strip combining parallel bars and spaces. The bars and spaces may be of variable widths. Bar codes are primarily used on labels which identify and provide brief information about the products, parts or items which they mark. Such labels are generally prepared by machines to be sensed and read only by other machines.

Punched cards and punched tapes express characters as coded patterns of holes. The codes so used are generally decimal-based; binary coding is less commonly used. As compared to the BYTSC System, their several designs, codes, formats and functions are similar. They are used mainly as input media to and between machines, and to a lesser but important degree as media for output and storage. While their codes can be sight-read by people, it is seldom done. The codes and formats used for punched cards and tapes result in very bulky information. It is one to two magnitudes less dense than printing; it is many magnitudes less dense than other machine media. The use of these information media is declining.

Edge-coded cards use combinations of holes and notches on the card periphery to encode information. Their main advantage is that their information can be searched and sorted either manually or by machine. As with conventional punched cards, they are a very bulky, low-density storage medium. Their use is declining.

Optical Character Recognition Systems (OCR) use machines that read printed text. Such text can be read by people also. Most OCR systems use special printed fonts; some read common printing or even hand writing. Their reading accuracy is relatively low. The Handbook Of Bar Coding Systems (ISBN 0-442-21438-8) Chap. 8, OCR Technology, FIG. 8.6., illustrates typical OCR fonts. The font OCR-A is "-distorted to maximize machine readability".

Further, FIG. 8.1. of the same reference illustrates the rigidity of the specifications for OCR reading. Much of this rigidity and resulting constraint of styling results from the complexity of traditional characters.

U.S. Pat. No. D230,204, Type Font, Jan. 29, 1974, Kretchman, illustrates adaptations of typical type faces to enable machine reading. They also retain readability by humans.

U.S. Pat. No. D241,776, FONT OF DIGITAL CHARACTERS OR THE LIKE, Oct. 5, 1976, Bibl and others, illustrates a more extreme adaptation of type characters, presumed to be for machine reading, as well as being legible to people.

The OCR type faces and other machine-readable character sets illustrate the common evolutionary trends to adapt very old characters to be sensed and read by modern machines. The term previously quoted, "distorted", is appropriate to this approach to change.

Referenced by U.S. Pat. No. D230,204, IBM Technical Disclosure Bulletin, vol. 7, No. 1, June 1964, p.48, Coded Font, explains the design objective of fonts to be read by machines as being "- legible for the human being and also are adapted for reliability (sic) machine reading."

Magnetic Ink Character Recognition Systems (MICR) are the common method of encoding and processing information on financial checks in the United States. The coding of MICR characters is not apparent to the casual user except that the necessary format standards for machine processing produce distorted, unattractive printing.

Characters encoded for MICR are printed and processed by machines but they can also be read by humans. The high reliability required is achieved by very close contact between the sensors and the printed characters. As with OCR characters, the magnetic characters must be printed to very exact specifications. Again, none of the broad ranges of styles, sizes and materials can be tolerated; the resulting systems can be used effectively in only a few applications. Their appearance is not suitable for normal text.

Magnetic media such as tapes, disks, drums and strips generally encode their information in the ASCII (American Standard Code for Information Interchange) code in a variety of formats. Regardless of their specific formats, the comments to follow, relative to ASCII, are pertinent to their unsuitability for the BYTSC object.

Some elements of the communications art are not systems but are functional components used in various systems. The ASCII is a standard code of decimal and eight-bit binary numbers. It is widely used internally in computers and communications. It does not provide any format for display or expression in the normal media of human communication. It can be sight-read by only a few technical people. Its code as such is unsatisfactory for expressing common characters because more than thirty of its first briefer codes are used for the housekeeping commands of communications and computer operation. This causes the commonly-used characters to have codes too large and awkward to be easily learned and expressed.

It is clear from these and other references that there is significant need for a single pervasive character set and an associated system. It must be universally pervasive, easily readable and useable by people and machines. Further, it must be attractive and capable of all the styles, grace and size range of present character sets.

Systems for designing conventional type fonts have become available recently. They are a natural outgrowth of recent advances in computer graphics. One such is the Metafont SYstem. That system, created by Donald E. Knuth, is described in two volumes of a series of five volumes, Computers and Typesetting, published by Addison Wesley Publishing Company. The magnitude and complexity of the system is inferred by the large size of that publication. The intrinsic complexity of traditional character images is the direct cause of those problems of magnitude and complexity.

Many systems of communication serve limited needs. Railroad semaphores signal only a few messages. Whistles used on railroad engines and for other applications are used for very limited, crude signaling. Chimes of clocks signal fractions of hours and identify the new hour. Traffic signals usually communicate three to five commands only. Blinker signaling continues to be used, primarily between naval ships. Meters require close attention to read visible indicators when the user may need to observe an operation being measured. Possible adaptation of many of these systems to BYTSC concepts is obvious. Such modifications can create substantial improvements to the effectiveness of their tasks.

COMMUNICATIONS IN UNCOMMON MEDIA

Text expression in tactile or audible media is uncommon and specialized. The Braille Code is used by the sight-impaired to sense and read characters by touch. The Morse Code uses combined audible and graphic media to communicate by electrical transmission.

The system barriers to widespread use of the Braille, even among blind people, typify the problems of communicating in uncommon media. The initial barrier is that the Braille characters use uncommon codes and formats. This, in turn, generates other debilitating barriers. First, it is difficult to find and train teachers to understand the codes and formats, and the unique problems of the medium; most teaching and learning is done outside of the classroom in living activities. Second, the codes and formats and strange media combine to limit severely the availability of text material. Moreover, the devices and supplies are unique and scarce.

The importance of the BYTSC System in this environment is not to patch or improve a special application such as Braille. Rather, it is to provide a general solution to character expression and communication applicable to all media. Applications not previously feasible, as well as old applications only partly solved, may then move into common compatible solution. Along with this, contributions to existing applications such as Braille, become enormous.

However, a rare synergism exists among those old, partially effective systems, and new BYTSC System applications yet to be conceived. The teaching and support procedures for those relatively awkward old systems are the means needed initially to create and embed new, improved systems. Also, they offer proof of the feasibility of the BYTSC System even in its different environment.

An analogy of this synergism, relative to the Morse code, is a confirmation of the feasibility of BYTSC communication in the audible medium. During development, BYTSC characters and text were expressed audibly by means of computer-generated sounds. But the real credible confirmation of the audible feasibility of the BYTSC System resulted from using expression techniques used in training for the Morse Code.

To illustrate, a person familiar with graphic BYTSC characters was addressed with voiced BYTSC characters (dada da didadum dadadada dididada). The person shouted recognition of her name (CAROL) before the characters were fully voiced.

Such exercises are more than trivial novelties. They indicate the ease of learning the system, and the personal enthusiasm generated by the new system, even in uncommon media.

The whole background of the uncommon media suggests applications which will become possible with broad understanding of the system concepts. Meters can display both graphic and audible readings. The same dual expressions have many applications.

Of the five basic senses, touch and sound, in addition to the graphic, offer best new opportunities for character-based communication. These apply either singly or in any combination.

OBJECTS AND ADVANTAGES

The general object of the BYTSC System is to replace the many present different character communication systems, regardless of their medium or language, with a single system of BYTSC characters, codes, formats and production capability.

The system provides for and encourages compatible extensions to achieve its primary object. That object must be initiated by the acceptance of BYTSC concepts into printed and other graphic character media. Entering BYTSC into the broad massive stream of communication will allow users to hold it, access it and learn the concepts on their own terms and will.

The novel codes and formats of the BYTSC System are universally applicable to any communication which uses characters. The BYTSC codes and formats are adaptable to be extended. They encourage an unlimited range of styling. They can be expressed and sensed in multiple media, singly or concurrently. The characters are an improved replacement for most alphabets, numbers and associated characters.

The standard characters of the system can be expressed in any medium in which a bit of information, or its absence, can be expressed and sensed. In addition to graphic expression, such bits, or their absence, including sound or silence, or an electrical pulse ON or OFF, or a tactile bump or its absence, or vibration, or a light pulse, or any such fundamental signal, can be used in a group to express information in the BYTSC Codes. Then, if a person or a device can sense such a string or group of bits or pulses, and sense patterns of pulses present and absent, either serially or in parallel, the group can be understood as information in the BYTSC System.

The new styles of characters, once made available by the BYTSC computer system, become a major resource for other means of production, and for reentry into the system with endless modifications and style variations.

The intrinsic nature of the BYTSC concept is an advantage to the new user-learner. The familiar structure of the Roman alphabet and its language association is retained. Yet the system is packaged in a challenging arithmetic, attractive to many people. The learner has the choice of learning its expression either by this low technical approach, or by simple rote.

The vertical symmetry of BYTSC characters in graphic display offers a major advantage to pervasive conversion to the system. Many people use text wherein the line formats flow from right-to-left, contrary to the Roman left-to-right flow. Because BYTSC characters are symmetrical about the vertical axis, they look the same regardless of such differences of line flow. This will reduce the shock of converting to an unfamiliar system. Further, the same advantage may apply to converting writing which uses vertical line formats.

The advent and pervasive availability of the computer, used as an information machine, make the BYTSC System practical. Prior to this, and the associated development of computer-graphics, no such transition has been practical. The initial applications of the BYTSC System must be graphics and printing. It is also of critical importance that the same computer makes the BYTSC System feasible in other media such as sound and touch. New styles, once created using the computer, can then be used in other media.

Morse's communication system was intended to, and did, fill a narrow need for communication. The BYTSC System fills many general and narrow needs with a single set of codes.

DRAWING FIGURES AND TEXT PAGE REFERENCES

FIGS. 1 through 11 are arranged to provide basic understanding of the BYTSC System. FIGS. 15- are samples of different BYTSC text produced by settings of the BYTSC program as listed in Appendix A.

FIG. 1 is a flowchart of the BYTSC System.

FIGS. 2 through 4 show illustrations of BYTSC text in three typical styles.

FIG. 5 shows a typical font of BYTSC printed characters and text illustration in the Display Format.

FIG. 6 shows the table of codes for BYTSC characters.

FIG. 7, shows the general format for BYTSC characters.

FIGS. 8 and 9 illustrate the printed expression of two typical BYTSC characters, grossly enlarged.

FIG. 10 shows a typical set of three simple symbols of graphic bits, used to differentiate the character modes in a set of characters.

FIG. 11 shows a range of typical styles of sets of graphic bit symbols.

FIGS. 12, 13 and 14 illustrate variations of the basic BYTSC format.

DESCRIPTION OF THE INVENTION

Figure 1:
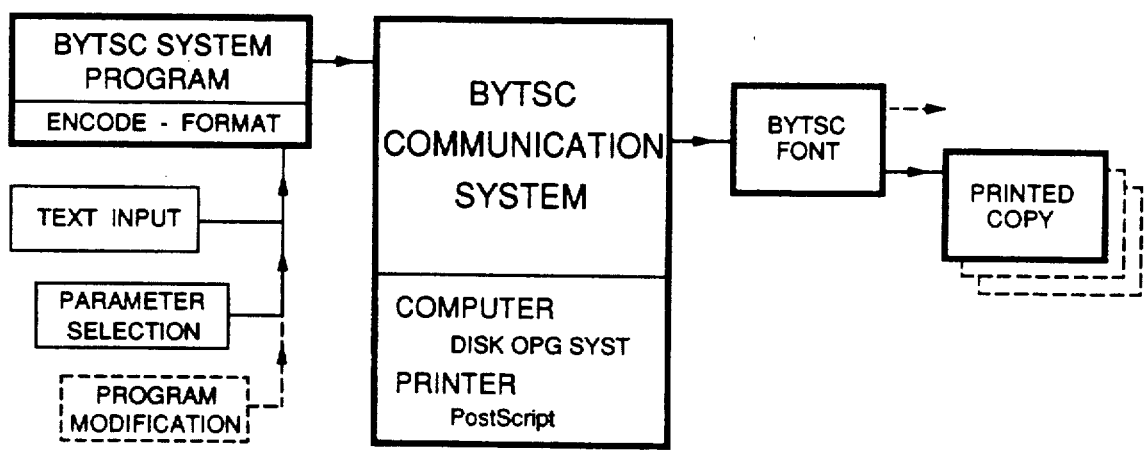

The four elements of the BYTSC System are: (1) character codes, (2) character formats, (3) the machine - a computer system, and (4) the special operating program. The codes and the formats are the foundations of the system.

1. BYTSC Codes—the BYTSC Code for any character is a set of numbers and a letter. The code for a character defines its appearance, or other form of expression such as sound.

FIG. 6, Sheet 4, is three tables, each table having five columns, listing the characters and codes presently assigned for the BYTSC System. The process of coding apparent in the tables can be extended to encode a total of 256 characters.

The BYTSC System expresses characters in formats that represent binary numbers. However, decimal numbers are our generally accepted number system. Therefore, any character to be coded for BYTSC expression is first assigned a decimal number code. The second column of each table, labeled DEC Code, lists the decimal code for each character.

Lowercase Roman letters [a] through [z] are assigned decimal number codes 1 through 26, respectively. Additional numbers are left unassigned in that table section; they invite code assignments for future uses.

Capital letters [A] through [Z] are assigned decimal number codes 33 through 58, respectively. The decimal code for any capital letter is derived by adding 32 to its corresponding code for its lower case.

Non-letter characters are assigned decimal codes 64 through 95, including some interspersed unassigned codes.

Decimal codes 96 through 255 are available for assignment either as category blocks of characters, or as individual characters.

The third column of each table, labeled BINARY CODE, lists the eight-bit binary code for each character. For example, the eight-bit binary code for the lowercase [u], which has a decimal value of 21, is 00010101. As is conventional, only the significant digits, 10101, are shown in the table. A second example is the semicolon [;] character: its decimal number code is 83; its corresponding eight-bit binary code is 01010011; the single leading zero is omitted in the table. Its eight-bit binary code is displayed as 1010011.

The BYTSC Display Codes, listed in columns four and five in each table of FIG. 6, are an essential means for the system to display characters in a brief five-bit format. The fourth column, labeled MODE, lists the display modes and the fifth column, labeled CODE, lists the display codes. The Display Codes use a maximum of five digits for the binary character code, plus a letter expressing the mode of the character. That briefer number code, and its resulting simpler character, is necessary for the successful introduction and acceptance of the system. The Display Codes provide compact display, easier learning and general attractiveness for the BYTSC System. In FIG. 6:

The Display Code for capital [U] is C 10101. The letter indicating Mode C signifies that the character is a capital letter. Further, C 10101 signifies that the BYTSC character corresponds to the capital form of the twenty-first letter of the Roman alphabet. Note that the display codes for all capital letters delete the one in the sixth binary position from their respective eight-bit binary code number. Also, all of the Display Codes for capital letters are classified as Mode C for their Display Formats.

The Display Code for lowercase [u] is L 10101. The Mode L signifies lowercase letter.

The Display Code for semicolon [;] is S 10011. The Mode S signifies special character.

The Display Code for number [6] is N 110. The Mode N signifies number.

The mode of a character determines its appearance, or other rendition, when the character is expressed. For example, capital letters are similar to lowercase letters when printed, but they are enhanced in appearance.

The embodiment of characters in typical printed Display Format is illustrated in FIG. 5, Sheet 3. No character uses more than five bit-locations since its mode is indicated by distinct designs of the bit-symbols. While the cleartext translation below each character confirms the mode, the mode is also evident from context understanding. Referring to FIG. 5, Sheet 3:

The top line of BYTSC print is the lowercase alphabet; it is all Mode L.

The second line down of BYTSC print is the capital letters; it is all Mode C.

The third line, beginning, is BYTSC numbers using Mode N.

The third line, ending, is BYTSC special characters using Mode S.

The fourth line, a sample of BYTSC graphic text, illustrates the basic character mode discrimination enabled by the Display Format. Lowercase and capital letters, and the punctuation period, are all separately and easily recognizable.

Disregarding leading zeros, the BYTSC binary codes, FIG. 6, for lowercase letters are the same for their eight-bit code, column three, and their brief five-bit Display Code, column five.

The BYTSC codes for letters have been selected for compact brevity of their expressed characters, regardless of the medium. Approximately 65% of the letters most common in English text usage have BYTSC characters which use no more than four bit-locations.

The table in FIG. 6, Sheet 4, labeled NUMBERS AND SPECIAL CHARACTERS, lists the BYTSC codes for the decimal numbers. Their decimal codes include 64 through 73. Zero is encoded decimal 64. Their general pattern of codes is similar to the letters.

Display Codes for numbers are designated as Mode N for numbers. The full eight-bit binary codes for numbers all have One as their seventh-place digit. A One in the seventh-place digit signifies the decimal value 64. The eight-bit code for any number is clipped to five bits to form its Display Code. Therefore, all Display Codes for numbers omit the One in the seventh-place digit of their eight-bit binary code. Zero is arbitrarily encoded as binary Zero Zero.

Arithmetic operators, punctuation and special characters are illustrated in FIG. 6 as decimal numbers 74 through 95. As shown, they are coded as Mode S, for special characters.

Unassigned code positions for common characters have been left distributed throughout the tables of FIG. 6. They are available to be assigned.

Only 96 character spaces are illustrated in FIG. 6. The eight-bit binary structure of the BYTSC System provides for 256 different characters. The balance of encodeable characters, 160 characters, is available for system extension.

2. BYTSC Formats—FIG. 7 illustrates the Standard Formats for expressing printed BYTSC characters. The characters are created by printing symbols for bits in the locations of the format defined by the binary number codes for characters. The formats for printed characters are used to express any of 256 characters.

For printed text, each rectangle within the character format, FIG. 7, is a locatiOn for a bit-symbol. If the code for the character has a One for that location, a bit-symbol will be printed there. If, instead, the code has a Zero value for that location, the Zero may be expressed with a dot-symbol or with a blank; either the dot or the blank has the same zero value.

In FIG. 7, four locations for bits are above the location for the reference-symbol Moving upward, the locations are for bit-1, bit-2, bit-3 and bit-4, respectively. In the same format, below the location for the reference-symbol, are the four locations for bit-5, bit-6, bit-7 and bit-8, respectively.

The designated bits, as used in the format, represent Ones in the binary number system. That system is a place-value system, as is the decimal number system. A One, as the left, or first-place, digit of a multi-digit binary number (places are counted left and right from an implied point separating whole and fractional parts, such as the decimal point for decimal numbers) has a decimal value of one. However, a One in the second-place, to the left of place-one, has a decimal value of 2, double the value of One in place-one. Continuing, a One in place-three, to the left of place-two, has a decimal value of 4, double the value of place-two, and double-double the value of One in place-one. Thus, binary number 111 has a decimal value of 7, (1+2+4). By the same logic, binary number 101 has a decimal value of 5, (1+0+4).

For clarity and assurance in character recognition, bit locations where there are no bits, that is where the value is zero, may be expressed by using dot-symbols.

FIG. 8 illustrates an enlarged BYTSC character of lowercase letter [e], the fifth letter of the alphabet. Because [e] is the fifth letter of the alphabet, its decimal code is 5. Thus, the BYTSC lowercase [e] is represented by a bit in the bit-1 location, which has a value of 1, and another bit in the bit-3 location, which has a value of 4; the sum of these bit values (1+4) equals 5, the decimal number code of lowercase [e]. A dot-symbol is shown in the bit-2 location to assure clarity; the dot-symbol representing the location of bit-4 is not needed or shown.

FIG. 9 illustrates the BYTSC character of lowercase letter [u], the twenty-first letter of the alphabet. Note that bit-1 and bit-3 are present and symbolized just as they were with the BCD character for the [e] of the preceding illustration. However, for the [u], the bit-5 location, one position below the reference location, is occupied by the bit-symbol, indicating that a value of 16 is also present. The total value for the character is decimal 21, (1+0+4+16), the decimal number code for the letter [u].

The full general eight-bit format illustrated in FIG. 7 indicates bit-6, bit-7, and bit-8 as dashed. This is to indicate that those bits are not normally used in the Display Format.

The preceding discussions treat character formats as being serial, relative to the sequencing of the bits. That is, they consider bit-1, then move sequentially to each next higher bit. For printed characters, the reference location expresses the starting point for the series of bits. But sensing and perceiving of bits, characters and words, and even groups of words, is commonly done in parallel by people and machines.

Once learned, BYTSC formats and character sets are intuitively understood without regard to serial or parallel format distinctions.

The several already common modes of sensing and perceiving characters in communication apply similarly to BYTSC communications. But BYTSC communications have the advantage of using a single format and using the same character structure for all media and applications.

Thus, BYTSC characters can be used in computers and communication devices just as present conventional codes are used. This applies regardless of whether they are used in serial or parallel mode. The same characters can replace the Morse Code. Braille is expressed as dots but sensed as characters; the same BYTSC characters can perform similarly.

The BYTSC format illustrated in FIG. 7 can be viewed and used as either a serial or parallel format. For example, a spoken or otherwise sounded bit-serial character stream, dada da didadum dadadada dididada, is a sounded expression of the name, carol. That use expresses bits as da and dum, and Zeros as di. Da is arbitrarily used to express bits one, two, three and four; dum is used to express bits five, six, seven and eight. Many typical variations, in different media, including visual, are obvious: a range of tones or frequencies can be used to identify individual numbered bits as for telephone dial tones; lights identified by position or color can be used to express BYTSC characters; and vibrators can identify specific bits either serially or in parallel for tactile or mechanical sensing.

The most common character code in current use is the ASCII. There is no single sequence used for expressing its binary character codes, either in machines, software or discussion; they may be expressed as high-to-low order, low-to-high or as mixed groups. Any discussion of the field must confirm the protocol being used. This precaution also applies to discussions of the BYTSC System.

The BYTSC Display Format is created by deleting the locations for bit-6, bit-7 and bit-8 which are two, three, and four positions below the reference location, from the full eight-bit format. Only bits one through five are used. Then, when expressed in the Display Format, each character uses unique-bit symbols whose appearance express the particular mode of that character, such as lowercase letter, capital, number or other. The four present display modes found useful signify that the character is either a lowercase letter, a capital letter, a special character such as punctuation or monetary unit, or a number.

The briefer code numbers, FIG. 6, columns five, designated for the Display Formats, signify by their modes, columns four, that specific bits have been omitted from their full eight-bit number codes. For example, display Mode C for capitals omits bit-6. Display Mode N for numbers and Mode S for special characters omit bit-7.

Within the basic formats for characters, the symbols for bits, dots and reference-symbols can be expressed with extensive freedom. This must be anticipated to offer freedom for even radical styling while retaining comfortable fluent recognition. This is particularly true relative to the shape, appearance and color of the symbols; it applies to a lesser extent to the size and locations of the symbols within the characters.

The bit-symbol shapes of FIG. 10 are only typical. The sets of symbols shown in FIGS. 11 are conservative and restricted. Only the most elemental disciplines of the codes and formats, however, need to be discernable for fluent accurate communication with the BYTSC System. This relaxed discipline and freedom is necessary to encourage creative styling and use of this new communications system.

Other formats for BYTSC display obviously will be needed as the BYTSC concepts achieve wide acceptance. One example is a briefer four-bit format and display. Another is a full eight-bit format for internal machine use; essentially, it would express BYTSC codes for characters in ASCII format for either serial or parallel expression.

Drawing Sheet 7 illustrates three typical variations of the basic BYTSC System. Such variations obviously will be created as the system becomes widely understood. Some will result from ranges of style; others, such as the four-bit version of BYTSC, will be induced by functional needs.

FIG. 12 illustrates a typical version wherein the reference-symbol has been omitted from the format of all characters. Its function has been replaced by differences in the appearance and use of the symbols for bits. The characters using such a format are easily identified; learning time is very brief when the basic BYTSC format is familiar.

FIG. 13 illustrates another typical version of the BYTSC format. In it, the appearance of all the bits is the same; groups of characters and classes of characters are differentiated by the appearances of a set of different reference-symbols.

FIG. 14 illustrates a typical version of a full BYTSC character set using characters expressed by using only four bit-symbols. In the illustration, the reference-symbol could have been used to define character's identity. Instead, in this version, the identity of the groups and classes of characters is done solely by using selective appearances of symbols for bits of bit-1, bit-2, bit-3 and bit-4.

The three different system variations expressed as graphics by the figures of Sheet 7 are analogous to similar variations for other media.

3. Computer System—the BYTSC System uses a general purpose computer. It includes a printer which is commanded by internal and/or external programming to create graphic character sets. If so commanded, the computer system will either produce sets of BCD characters, or produce copies of text expressed in the BCD character set. The computer system retains its other conventional capabilities.

The preferred configuration, which has produced all of the elements of this document, is a so-called personal computer and laser printer. The computer was purchased as a PC's Limited 286-8. It is conventional; it has a 20 mb hard disk and two so-called floppy disks; it operates with DOS (disk operating system). The specifications and operating procedures for the computer are described in the Owner's Manual and Guide to Operations, v1.0, dated Aug. 26, 1986.

The preferred printer is a Texas Instruments Model 2106 laser printer. It has a 2 mb memory. It operates with the PostScript language in its internal memory. Its graphic definition is 300 dots per inch for both height and width.

The system operates equally well, without modification, using a Texas Instruments Personal Computer and a Texas Instruments laser printer, Model 2115.

Printing for early developmental work was done by printing BYTSC character sets with a 24-pin matrix printer; results were good but not as good as when using the PostScript software and the higher-definition graphic devices. Developmental work confirming sound feasibility of the BYTSC codes used the same PCL 286-8 computer, employing the sound commands of the BASIC language. The sound output is produced by the internal speaker of the computer.

The flowchart of the BYTSC system, FIG. 1, Sheet 1, illustrates the relationships of system elements and the operating flows of the system. The four elements in heavy outline, activated by a knowledgeable user, without modification, will operate and produce the set of text samples shown in FIGS. 15A through 15H, Sheet 8.

The three elements shown in light outline on the lower left of FIG. 1 illustrate progressive user activities to activate practical operation of the system. TEXT INPUT refers to inserting new text or substituting user text. Using PARAMETER SELECTION within the program, the user can change print styles, sizes and general appearance of the system product. Last, PROGRAM MODIFICATION encourages the user to exploit further freedom and create new variations of BYTSC communication.

4. BYTSC Program—The BYTSC program, listed as Appendix A is the software means for creating a BYTSC font, and for producing printed text in that font.

Program Summary

The program is written in the PostScript page description language, a product of Adobe Systems Incorporated. PostScript is a trademark of that company. The BYTSC program uses the concepts of the PostScript language as generally described in the publications of the Addison Wesley Publishing Company. As listed, its lines are numbered on the right edge of the listing, approximately every tenth line, each number being preceded by %, such as %070 being line number seventy.

The program has two basic sections. The first section, through Line 162, is the program means for creating a BYTSC character set having shapes and appearance selected by the system user. The second section is the printing means of the program. It can produce either fonts for use elsewhere, or printed copies of text entered into the program. As listed, this section prints multiple samples of typical BYTSC text and a BYTSC font.

The program has been left simple and straightforward. It is flexible and invites experimentation, but many obvious ramifications have been omitted. An example is a means to improve the attractiveness of the characters as they are changed in size or intensity. Another example is that the present character elements—bits, dots and reference-symbols—are common symmetrical geometric shapes.

The present set of characters is adequate for extensive expression but the structure of individual character images and characters yet to be encoded invites wide participation in the standardization process. The Morse telegraphic code illustrates a comparable system, widely accepted, which went through a process of international standardization.

The second section of the program, Lines 165 to end, is the printing section. It is the means of calling and using the BYTSC character set created in the first section. It commands the conventional power of the PostScript system both as regards the BYTSC character set and the other character sets and graphic devices of the system.

As listed, the printing section calls, sizes and styles the BYTSC font, and prints a test sample in several font variations.

Functions of the Program

Character Formats and Elements—Lines 001-024 program the character format and basic shape of the character bounding box which is, in effect, a pallet on which to draw the many characters. Lines 026-058 program the shapes of the element symbols which represent bits. Lines 060-077 program the character modes, being combinations of bit shapes and reference-symbol responding to parameters selected by the user. Lines 079-086 define the locations of the symbols which make up the characters.

At Line 088, a dictionary, Bfont, is created and receives the ASCII code and standard character name needed by the computer system to define each character selected for coding. Lines 093-110 also express the BYTSC decimal code for each of the characters listed in the BYTSC Character Codes in FIG. 6 of the drawings. Example: character [u], line 096 right, is shown as 117/u 21. 117 is the ASCII code for [u]. [u] is the standard name for the character. 21 is the BYTSC decimal code for [u], provided for reference.

The character procedures dictionary, CharProcs which starts on line 112, expresses a procedure to draw each character. It defines the mode and the specific bits, dots and reference-symbol needed to draw the character. Example: character [u], Line 135 left, is defined as (mL b1 d2 b3 b5). Its mode is L, for lowercase letter. Its bits are bit-1, bit-3 and bit-5, as displayed in FIG. 8, Sheet 5. If dots are selected to be expressed, dot-2 is present. The dot at the bit-4 location is omitted. Bits -6, -7 and -8 are not present.

PostScript's BuildChar procedure, starting on Line 157, uses the Encoding array and the CharProcs to build the shapes of each of the characters and to store them.

Line 162 completes the creation of the BYTSC character set and stores it with other conventional character sets in the system. As stored, it defines the outline shape of each BYTSC character. It can be used just as other outline character sets. It can be generated repeatedly into fonts by selecting print size and using the PostScript makefont command options.

Means for Printing

Lines 165-168 select the size and spacings to be used with whatever font is currently defined.

Lines 170-177 set up a sample of text to be used repeatedly to demonstrate various styles and sizes of BYTSC printing. Other text can be used to replace the sample.

Lines 179 and 180 define a print routine which is called repeatedly starting on Line 182 to print multiple samples. The print parameters of its makefont operator are supplied just before the routine is called.

Lines 188-196 print cleartext labels for the samples using the standard Courier font.

Lines 201-203 print grossly enlarged BYTSC characters of the letter vowels and numbers for analyzing character shapes. The showpage command completes the BYTSC program and the sample printing. As listed, until a user modifies the program commands or the print sample, the program prints a multiple test sample which exercises some of the more common operating variables. Line 214, when activated, creates a two-page print, which enables the eight-bit sample overprint of FIG. 15D (explained further, following).

Operation of the Invention

The BYTSC System operates conventionally.

The user creates an ASCII-formatted PostScript file of the program as listed. The software interface of the printer is set to PostScript Batch. The conventional operating system commands are used to print the program as in file. The program will operate to produce FIGS. 15A-15H, Sheet 8. The control parameters and text can then be changed, using PostScript conventions, for other operating results.

Once setup for operation, anyone of moderate computer knowledge can produce a variety of BYTSC text in many sizes and styles. Lines 21-24 are logic switches which control character features as noted in comments on the right of each line. For example, Line 21, parameter=1 produces lowercase characters with filled bit symbols; setting parameter=2 produces outlined bits. Similarly, on Line 22, setting parameter=1 commands printing blanks instead of the dots that indicate zero locations in the character images; setting parameter=2 commands dots be displayed in such locations. As mentioned previously, any change which revises the fundamental appearance of the characters requires that the program be rerun. An example is changing between five-bit and eight-bit character formats, in either direction.

Type size, Line 165, commands the type size for BYTSC text. As listed, 32 produces nominal 32 point type when eight-bit characters are called; normal five-bit Display Format produces images ⅝ of that height. The PostScript makefont operator operates normally to produce extended, compressed, slanted or normal character configurations; Lines 182-186 illustrate the dynamic range of the command, makefont.

As stored in file, the BYTSC character set completed at Line 162 must be converted to specific fonts for printing. Briefly, that involves selecting the type size and appearances controlled by the makefont command. These include expansion, compression and slanting. Operations to produce the several samples of FIGS. 15A-15H are illustrated in the program:

The variable, Tsize, set as 32 points in Line 165, determines the size of the printed characters. The makefont command, Line 179, is activated repeatedly in Lines 183-187 to print FIGS. 15A, -B, -C, -F and -G, respectively.

Figures 15A, 15B, 15C, 15D, 15E, 15F, 15G, 15H:
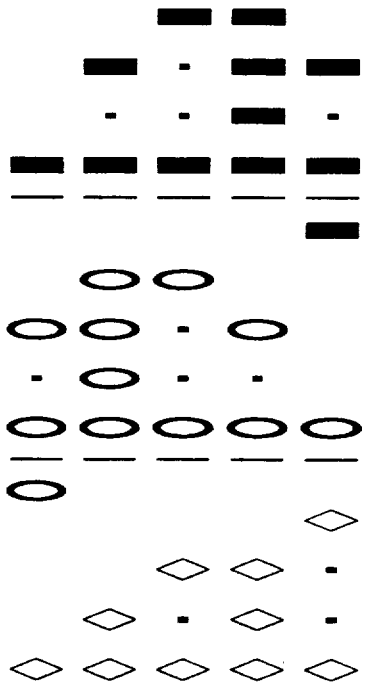
FIGS. 15A through 15H show the set of text samples produced by the BYTSC computer program using a variety of control parameter settings and samples of text.

Lines 206-208 produce FIG. 15E which displays a full font of the present BYTSC character set.

FIG. 15H is produced by Lines 199-203. Selected characters are grossly enlarged to examine details of the elements of the character configurations.

FIG. 15D is the sole illustration of printed eight-bit characters. As such, it uses a different character set from the five-bit characters of the other illustrations. Therefore, it must be produced by overprinting a separate run of the program: the first character of Line 214, %, is deleted; the program is run and produces two pages of output; the pages are reversed and reinserted into the papertray of the printer; the 5 in Line 024 is changed to 8; the program is rerun; the unwanted incorrectly-labeled page is discarded.

Conclusion, Ramifications and Scope of the Invention

The BYTSC system provides a practical single means of replacing present multiple commonly used character sets. It is responsive to major pressures in our cultures today for a system which uses a common alphabet that is numerically-based. It is compatible for use in computers and other electronic applications. It is easily learnable. It provides a bridge to the bit/byte orientation of the field of electronic information. Thereby, learning it can convince many people that they can participate in the current evolution/revolution of information.

The BYTSC Codes and Formats can be promulgated initially only by means of the BYTSC Program and computers. Once that is achieved, however, the system can be sustained and grown by using additional means. So, characters using the BYTSC Codes and Formats can obviously be expressed by present conventional means. These include impact printing and other common graphical processes. Typewriters and other printers are obvious graphical means.

Some ramifications of the BYTSC System are obvious. A tactile-sensed implementation is simple to create since it will use the same character codes. An audible implementation is even easier because major portions of the program can be used in personal computers intact and converted to audible information directly. Both of these offer special hope for people having impaired vision or hearing since people with whom they associate and learn will share their same character set. Further, people whose senses progressively fail will only have to learn to use a new sensing medium since the same BYTSC character codes apply to all media. Concurrent multiple sensing—for example, any combination of graphic, audible and tactile sensing—can reinforce both learning and ordinary use.

%     H.W.VAUGHAN     APPENDIX A     PAGE 1 OF 6

%            PROGRAM LISTING for BYTSC Communication System

```
/HeightRatio             7.5  def
/HR              HeightRatio  def
/charWidth       {800 HR div} def   % Calculate - height / height ratio
/charSpace    {charWidth .4 mul} def   % Calculate - between characters
/width {charWidth charSpace add} def   % Calculate - width + apace between
```

```
/Bratio        .30              def    % Bit occupancy of bit space - vertical /bbH  400                       def    % Bounding Box - above reference line
/bbL  -400                      def    % Bounding Box - below reference line
/bbW           {charWidth}      def    % Bounding Box width              %010
/bH   {100 Bratio mul}          def    % Bit height - bit space X ratio
/bW   { bbW }                   def    % Bit width - equals bounding box width
/hbW  {bW  2 div}               def    % Half bit width - for centering
/hbH  {bH 2 div}                def    % Half bit height
/dhbH {hbH 1.4 mul}             def    % hbH - enlarged for diamond bits /Tsize  10                      def    % Temporary
/lWC  {.35 Tsize mul}           def    % Line width for outlined capitals
/lWlc {.07 Tsize mul}           def    % Line width for lowercase letters
                                                                         %020
/Fillswitch    1                def    % 1 / filled characters   2 / outlined
/Dotsswitch    2                def    % 1 / no dots             2 / dots
/Shapswitch    1                def    % 1 / rectangular bits    2 / altn shape
/5to8switch    8                def    % 5 / 5-bit characters    8 / 8-bit /rtBitbl {hbW  hbH rmoveto                              % Rect bit black
        0 bH neg rlineto bW  neg 0 rlineto 0 bH rlineto
        closepath fill} def
/rtBitol {hbW  hbH rmoveto                              % Rect bit outlined
        0 bH neg rlineto bW  neg 0 rlineto 0 bH rlineto                  %030
        closepath stroke} def
/cpBitrt {hbW hbH rmoveto                               % Caps bit rectangl
        0 bH neg rlineto bW neg 0 rlineto 0 bH rlineto
        closepath gsave 10 setlinewidth stroke grestore} def
/cpBital {gsave currentpoint translate                  % Caps bit alternat
        1 1 3 div scale   hbW 0 moveto   0 0 hbW 0 360 arc
        15 setlinewidth stroke grestore                    } def
/alBitbl {gsave currentpoint translate                  % Altn bit black
        1 1 3 div scale   hbW 0 moveto   0 0 hbW 0 360 arc fill
        grestore                             } def                       %040
/alBitol {gsave currentpoint translate                  % Altn bit outlined
        1 1 3 div scale   hbW 0 moveto   0 0 hbW 0 360 arc stroke
        grestore                             } def
/diBitbl {0  dhbH rmoveto    hbW dhbH neg rlineto       % Diamond bit black
        hbW neg dhbH neg rlineto    hbW neg dhbH rlineto
        closepath fill} def
```

```
/diBitol {0   dhbH rmoveto     hbW dhbH neg rlineto         % Diamond bit outln
         hbW neg dhbH neg rlineto    hbW neg dhbH rlineto
         closepath stroke} def
                                                                         %050
/bit8 {5to8Switch 8 eq {/bB {rtBitbl} def} if} def          % All-black bits /mL  { /rL {refLine} def rL
         ShapSwitch 1 eq FillSwitch 1 eq and {/bB {rtBitbl} def} if
         ShapSwitch 1 eq FillSwitch 1 gt and {/bB {rtBitol} def} if
         ShapSwitch 1 gt FillSwitch 1 eq and {/bB {alBitbl} def} if
         ShapSwitch 1 gt FillSwitch 1 gt and {/bB {alBitol} def} if
                                                bit8                } def
                                                                         %059
/mC  { /rL {refLine} def rL       /bB {cpBital} def    bit8         } def
/mN  { /rL {}          def rL     /bB {diBitol} def    bit8         } def
/mS  { /rL {refLine} def rL       /bB {diBitol} def    bit8         } def /refLine {0 0 moveto bW 0 rlineto lWlc setlinewidth stroke} def
/rL { refLine } def /dit { 10 5 rmoveto  0 -10 rlineto  -20 0 rlineto  0 10 rlineto
                              closepath fill        } def
/dot { DotsSwitch 1 gt  { dit } if } def
/bD  {   dot  } def                                                      %070
/z1  {loc1 dit} def       /z2 {  loc2 dit  } def    % Zero elements /cx {charWidth 2 div} def     /pos { cx exch moveto } def
/loc1 {  65 pos} def   /loc5 { -65 pos} def          % Bit locations within
/loc2 {165 pos} def    /loc6 {-165 pos} def          %   character structure
/loc3 {265 pos} def    /loc7 {-265 pos} def
/loc4 {365 pos} def    /loc8 {-365 pos} def /b1 {loc1 bB·rL} def               /d1 {loc1 bD rL} def
/b2 {loc2 bB } def                 /d2 {loc2 bD} def                     %080
/b3 {loc3 bB } def                 /d3 {loc3 bD} def
/b4 {loc4 bB } def
/b5 {loc5 bB } def
5to8Switch 5 eq { /b6 {} def  /b7 {} def   /d5 {} def   /d6 {} def   }
                { /b6 {loc6 bB} def /b7 {loc7 bB} def
                  /d5 {loc5 bD} def   /d6 {loc6 bD} def          } ifelse /Bfont 10 dict def      Bfont begin    % Primary dictionary
```

```
/FontType 3 def
/FontMatrix[.001 0 0 .001 0 0] def                                              %090
/FontBBox [0 bbL width bbH] def /Encoding 256 array def      0 1 255 { Encoding exch /.notdef put} for
 97 /a  1    98 /b  2    99 /c  3   100 /d  4   101 /e  5   102 /f  6   103 /g  7
104 /h  8   105 /i  9   106 /j 10   107 /k 11   108 /l 12   109 /m 13   110 /n 14
111 /o 15   112 /p 16   113 /q 17   114 /r 18   115 /s 19   116 /t 20   117 /u 21
118 /v 22   119 /w 23   120 /x 24   121 /y 25   122 /z 26

65 /A 33    66 /B 34    67 /C 35    68 /D 36    69 /E 37    70 /F 38    71 /G 39
 72 /H 40    73 /I 41    74 /J 42    75 /K 43    76 /L 44    77 /M 45    78 /N 46
 79 /O 47    80 /P 48    81 /Q 49    82 /R 50    83 /S 51    84 /T 52    85 /U 53
 86 /V 54    87 /W 55    88 /X 56    89 /Y 57    90 /Z 58                       %102

48 /0 64    49 /1 65    50 /2 66    51 /3 67    52 /4 68    53 /5 69    54 /6 70
 55 /7 71    56 /8 72    57 /9 73

43 /+ 74    45 /- 75    61 /= 76    42 /* 77    46 /. 81    44 /, 82    33 /! 84
 58 /; 85    59 /: 86    36 /$ 88    38 /& 89    34 /" 92    39 /' 93    63 /? 94

76 { pop Encoding 3 1 roll put } repeat                                         %110

/CharProcs 79 dict def     CharProcs begin     /.notdef {} def

/a {mL b1              } def      /A {mC b1            d5 b6   } def
/b {mL d1 b2           } def      /B {mC d1 b2         d5 b6   } def
/c {mL b1 b2           } def      /C {mC b1 b2         d5 b6   } def
/d {mL d1 d2 b3        } def      /D {mC d1 d2 b3      d5 b6   } def
/e {mL b1 d2 b3        } def      /E {mC b1 d2 b3      d5 b6   } def
/f {mL d1 b2 b3        } def      /F {mC d1 b2 b3      d5 b6   } def
/g {mL b1 b2 b3        } def      /G {mC b1 b2 b3      d5 b6   } def%120
/h {mL d1 d2 d3 b4     } def      /H {mC d1 d2 d3 b4   d5 b6   } def
/i {mL b1 d2 d3 b4     } def      /I {mC b1 d2 d3 b4   d5 b6   } def
/j {mL d1 b2 d3 b4     } def      /J {mC d1 b2 d3 b4   d5 b6   } def
/k {mL b1 b2 d3 b4     } def      /K {mC b1 b2 d3 b4   d5 b6   } def
/l {mL d1 d2 b3 b4     } def      /L {mC d1 d2 b3 b4   d5 b6   } def
/m {mL b1 d2 b3 b4     } def      /M {mC b1 d2 b3 b4   d5 b6   } def
/n {mL d1 b2 b3 b4     } def      /N {mC d1 b2 b3 b4   d5 b6   } def
/o {mL b1 b2 b3 b4     } def      /O {mC b1 b2 b3 b4   d5 b6   } def
/p {mL           b5    } def      /P {mC            b5 b6   } def%130
/q {mL b1        b5    } def      /Q {mC b1         b5 b6   } def
```

```
/r {mL d1 b2       b5              } def    /R {mC d1 b2       b5 b6       } def
/s {mL b1 b2       b5              } def    /S {mC b1 b2       b5 b6       } def
/t {mL d1 d2 b3    b5              } def    /T {mC d1 d2 b3    b5 b6       } def
/u {mL b1 d2 b3    b5              } def    /U {mC b1 d2 b3    b5 b6       } def
/v {mL d1 b2 b3    b5              } def    /V {mC d1 b2 b3    b5 b6       } def
/w {mL b1 b2 b3    b5              } def    /W {mC b1 b2 b3    b5 b6       } def
/x {mL d1 d2 d3 b4 b5              } def    /X {mC d1 d2 d3 b4 b5 b6       } def
/y {mL b1 d2 d3 b4 b5              } def    /Y {mC b1 d2 d3 b4 b5 b6       } def
/z {mL d1 b2 d3 b4 b5              } def    /Z {mC d1 b2 d3 b4 b5 b6       } def
                                                                                    %141
/0 {mN z1 z2       d5 d6 b7        } def    /5 {mN b1 d2 b3    d5 d6 b7    } def
/1 {mN b1          d5 d6 b7        } def    /6 {mN d1 b2 b3    d5 d6 b7    } def
/2 {mN d1 b2       d5 d6 b7        } def    /7 {mN b1 b2 b3    d5 d6 b7    } def
/3 {mN b1 b2       d5 d6 b7        } def    /8 {mN d1 d2 d3 b4 d5 d6 b7    } def
/4 {mN d1 d2 b3    d5 d6 b7        } def    /9 {mN b1 d2 d3 b4 d5 d6 b7    } def /" {mS d1 d2 b3 b4 b5 d6 b7        } def    /+ {mS d1 b2 d3 b4 d5 d6 b7    } def
/' {mS b1 d2 b3 b4 b5 d6 b7        } def    /- {mS b1 b2 d3 b4 d5 d6 b7    } def
/? {mS b1 b2 b3 b4 b5 d6 b7        } def    /= {mS d1 d2 b3 b4 d5 d6 b7    } def %150
/! {mS d1 d2 b3    b5 d6 b7        } def    /* {mS b1 b2 b3 b4 b5 d6 b7    } def
/$ {mS d1 d2 d3 b4 b5 d6 b7        } def    /, {mS d1 b2       b5 d6 b7    } def
/; {mS d1 b2 b3    b5 d6 b7        } def    /. {mS b1          b5 d6 b7    } def
/: {mS b1 b2       b5 d6 b7        } def
/& {mS b1 d2 d3 b4 b5 d6 b7        } def                                         end
/BuildChar
    {width 0    0 bbL width bbB
     setcachedevice  exch begin        Encoding exch get
     CharProcs exch get    end    exec                     }def         end /BYTSCfont Bfont definefont pop                                                 %162

/Tsize 32 def                                              /LM 72 def           %165
/Lspace {0.60 Tsize mul} def   /Pspace {1.20 Lspace mul}            def
/ss {show LM /Ypos Ypos Lspace sub def Ypos moveto}                 def
/ps {show LM /Ypos Ypos Pspace sub def Ypos moveto}                 def /DecInd {                                                                       %170
        ( from The Declaration of Independence)            ps
        (     -We hold these truths)                       ss
        (              to be self evident,)                ss
        (that all men are created equal,)                  ss
        (that they are endowed by their Creator)           ss
        (with certain unalienable Rights,)                 ss
                                                           } def
```

```
/prnt    {/BYTSCfont findfont exch makefont setfont
          dup /Ypos exch def moveto DecInd}              def    %180

LM 685  [Tsize   0  0 Tsize 0 0] prnt
LM 529  [Tsize 10 add 0  0 Tsize 0 0] prnt                      % Increase width 10
LM 373  [Tsize 10 sub 0  0 Tsize 0 0] prnt      /LM 360 def     % Compress width
LM 685  [Tsize        0 10 Tsize 0 0] prnt                      % Slant
LM 529  [Tsize        0 20 Tsize 0 0] prnt      /LM  72 def     % Slant /Helvetica findfont 10 scalefont setfont
LM 710 moveto (FIGURE 15A - NORMAL PRINT)        show
LM 554 moveto (FIGURE 15B - EXTENDED PRINT)      show              %190
LM 393 moveto (FIGURE 15C - COMPRESSED PRINT)    show
LM  73 moveto (FIGURE 15E - CHECK FONT)          show    /LM 360 def
LM 710 moveto (FIGURE 15F - SLANT PRINT (1))     show
LM 554 moveto (FIGURE 15G - SLANT PRINT (2))     show    /LM 340 def
LM 398 moveto (FIGURE 15H)                       show
LM 383 moveto (GROSS PRINT FOR CHARACTER ANALYSIS) show /BYTSCfont findfont 235 scalefont setfont
                                                                %200
360 283 moveto (aeiou) show
360 170 moveto (UOIEA) show
360  67 moveto (13579) show                      /LM 72 def /fnt (abcdefghijklmnopqrstuvwxyz  ABCDEFGHIJKLMNOPQRSTUVWXYZ   0123456789
+-=*.,!;:$&"'?) def
/BYTSCfont findfont 36.7 scalefont setfont LM 52  moveto  fnt  show
/Courier   findfont 9.12 scalefont setfont LM 33  moveto  fnt  show
                                                                %210
/Courier   findfont 10   scalefont setfont
215 761 moveto (H.W.VAUGHAN    SHEET  8 OF 8) show showpage    % - used to overprint 8-bit on second page /Helvetica findfont 10 scalefont setfont
LM 235 moveto (FIGURE 15D - EIGHT-BIT PRINT) show
72 210 [Tsize 0 0 Tsize 0 0] prnt showpage                                                        %220
```

Serial Number: 467965
Application Filed: January 22, 1990
Applicant: H.W.Vaughan
Application Title: A Communication System Which Uses Characters That Represent Binary-coded Decimal Numbers
Examiner/GAU: Kreiss, Kevin A. / GAU 237

Enclosure 1. to Amendment A

Amended Abstract

I claim:

1. A computer system for creating many styles of character sets by selecting the design, coding, and format to represent either a group of five-bit or a group of eight-bit binary-coded decimal numbers, said characters being useful for common communication, other than handwriting, by people or machines, in any sensible medium;

and for producing information in a sensible medium using the created character set by supplying the system with cleartext information and converting each character of such cleartext information to the corresponding character of the created character set;

said system comprising:

design means for designing said character set by means for setting logical switches expressed as programmed instructions, said switches selecting five- or eight-bit binary characters, selecting choices of designs for expressing bits, selecting whether zeros will be indicated in characters or simply left blank, and the like;

means for setting parametric values included in the programmed instructions which determine dimensions, measurements, placement, and spacing of the parts which will be assembled into whole characters; and means for changing programmed instructions to define new shapes and expressions of parts and assembled characters to achieve the same design and styling freedom as is commonly practiced in typography to express conventional Roman and other character sets;

codes means for coding said character set, said code means comprised of means for maintaining a programmed coding array and dictionary by changing the coding for any character; encoding new characters into the character set;

means for setting a programmed logical switch to select either five- or eight-bit binary characters; and means for retrieving the identity of each successive cleartext character called to be coded, retrieving the binary and alpha code for said character called to be coded from said coding array and dictionary, and making that code so retrieved available to a format means;

said format means for formating said character set, said format means comprised of means for retrieving successively the code for each cleartext character called by the program and retrieving the elements selected by the design means;

means for assembling the elements so selected into a virtual image of the binary character to represent said cleartext character according to the information retrieved from the design means process, and the instructions of the program; and means for accumulating the character images so assembled into a character set and making said character set available for output, and available for production of information expressed therewith;

delivery means for delivering the product of the computer system, that is, the created character set or information expressed using said created character set, to its destination as defined by the instructions of the program; and demonstration means to demonstrate the computer system and invite practice, learning and extension of its capability. said demonstration means comprised of means for defaulting the functions of the design, code and format means, whereby the system is operated as is, using preset programmed parametric and switch settings and a sample of clear text, and means for delivering said sample expressed in typical varied formats of binary-coded character sets, including delivering check fonts of both the cleartext characters and their equivalent conversion to binary-coded characters.

2. A computer system for creating many styles of character sets by selecting the design, coding, and format to represent either a group of four-bit or a group of eight-bit binary-coded decimal numbers, said characters being useful for common communication, other than handwriting, by people or machines, in any sensible medium;

and for producing information in a sensible medium using the created character set by supplying the system with cleartext information and converting each character of such cleartext information to the corresponding character of the created character set;

said system comprising:

design means for designing said character set, said
design means comprised of
  means for setting logical switches expressed as
    programmed instructions, said switches selecting four- or eight-bit binary characters, selecting choices of designs for expressing bits, selecting whether zeros will be indicated in
    characters or simply left blank, and the like;
  means for setting parametric values included in
    the programmed instructions which determine
    dimensions, measurements, placement, and
    spacing of the parts which will be assembled
    into whole characters; and
  means for changing programmed instructions to
    define new shapes and expressions of parts and
    assembled characters to achieve the same design and styling freedom as is commonly practiced in typography to express conventional
    Roman and other character sets;
code means for coding said character set, said code
  means comprised of
  means for maintaining a programmed coding
    array and dictionary by changing the coding
    for any character; encoding new characters
    into the character set;
  means for setting a programmed logical switch
    to select either four- or eight-bit binary characters; and
  means for retrieving the identity of each successive cleartext character called to be coded,
    retrieving the binary and alpha code for said
    character called to be coded from said coding
    array and dictionary, and making that code so
    retrieved available to a format means;
said format means for formatting said character set,
  said format means comprised of;
  means for retrieving successively the code for
    each cleartext character called by the program
    and, retrieving the elements selected by the
    design means;
  means for assembling the elements so selected
    into a virtual image of the binary character to
    represent said cleartext character according to
    the information retrieved from the design
    means, and the instructions of the program;
    and
  means for the character images so assembled into
    a character set and making said character set
    available for output, and available for production of information expressed therewith;
delivery means for delivering the product of the
  computer system, that is, the created character
  set or information expressed using said created
  character set, to its destination as defined by the
  instructions of the program; and
demonstration means to demonstrate the computer
  system and invite practice, learning and extension of its capability, said demonstration means
  comprised of
means for defaulting the functions of the design,
  code and format means, whereby the system is
  operated as is, using preset programmed parametric and switch settings and a sample of clear
  text, and means for delivering said sample expressed in typical varied formats of binary-coded
  character sets, including delivering check fonts
  of both the cleartext characters and their equivalent conversion to binary-coded characters.

3. The computer system of claim 1 wherein format
means creates characters for expression in the graphic
and tactile mediums,
  said format means for formatting each character by
    assembling the symbols for binary bits, which collectively represent the binary number code for said
    character, into two distinct, easily recognized and
    readable groups within said character by
    stacking bit symbols for the first group, including
      bits one through four, if present in the binary
      number code for said character, sequentially
      above the location for a reference symbol;
    stacking bit symbols for the second group, including bits five through eight, if present in the binary number code for said character, sequentially below the location for a reference symbol;
    and
    expressing a reference symbol, common for all
      characters except numbers, in said location between the two groups of bits, absence of said
      reference symbol emphasizing that the character
      represents a number; and
  discriminating between major classes of characters
    within any character set by using a plurality of unique
    symbols to represent bits, each of said unique symbols
    for bits being used to represent all of the characters of
    only one major class of characters such as lowercase
    letters, capital letters, and the like.

4. The computer system of claim 1 wherein the format means creates characters for expression in the
graphic and tactile mediums,
  said format means for formatting each character by
    using a plurality of unique reference symbols, to
    discriminate each major class of characters within
    any character set, such major classes of characters
    being lowercase letters, capital letters, and the like,
  said unique reference symbol for each character separating symbols for binary bits, which express said
    character, into two distinct, easily recognized and
    readable groups by
    stacking bit symbols for the first group, including
      bits one through four, if present in the binary
      number code for said character, sequentially
      above the location for a reference symbol;
    stacking bit symbols for the second group, including bits five through eight, if present in the binary number code for said character, sequentially below the location for a reference symbol;
    and
    displaying said unique reference symbol in said
      location between the two groups of bits, thereby
      designating said character as being in that major
      class represented by that reference symbol, except for number characters whose class of character is indicated by the absence of any reference
      symbol.

5. The computer system of claim 1 wherein the format means creates characters for expression in the
graphic and tactile mediums,
  said format means for formatting each character to be
    read more easily and reliably, by separating the
    symbols for binary bits of each character into two
    groups of bits, and expressing the bits of each said
    group of bits with a different bit symbol unique to
    its group by
    stacking bit symbols for the first group, including
      bits one through four, if present in the binary
      number code for said character, sequentially
      above the location for a reference symbol, all bits of the first group being expressed as a common bit symbol;

stacking bit symbols for the second group, including bits five through eight, if present in the binary number code for said character, sequentially below the location for a reference symbol, all bits of the second group being expressed as a common bit symbol different from the bit symbol used to express the bits of the first group; and displaying only a blank space in said location for a reference symbol between the two groups of bits; and using unique pairs of symbols to express only the bits of each said major class of characters, thereby discriminating between major classes of characters of the character set, such as lowercase letters, capital letters, and the like, for five-bit character sets.

6. A computer process for encoding cleartext characters as dual binary codes, said code for any cleartext character representing both an eight-bit and a five-bit binary number, said computer process comprising the steps perform by a computer of:

creating and maintaining a programmed dictionary wherein each named cleartext character of a set is defined as a dual code which represents both a simple eight-bit binary number, and an equivalent five-bit binary number code plus an alphabetic designator which distinguishes between major classes of characters, such as lower case letters, capital letters, numbers, and the like;

maintaining said programmed dictionary by encoding new characters into said character set, selecting such new codes to preserve selection patterns already apparent, those patterns being essential to easy recognition, learning, and reading of the resultant characters;

creating one pattern of binary codes for all letters such that, for each letter, the presence and absence of bits one through five are identical in both the five- and eight-bit binary codes, and the presence or absence of bit-six discriminates lowercase or capital letter;

creating a second pattern of binary codes for letters by selecting the code numbers to represent the first fifteen lowercase letters of the Roman alphabet to use combinations of bits one through four only, and adding bit-6 to create the binary code of the same capital letter, that simplicity being essential to achieve easy learning, practical understanding, and broad use of this process and its products since said first fifteen letters express about 65% of all English text;

setting a logical switch, expressed as programmed instruction, to select either five-bit or eight-bit coding;

operating programmed instructions to identify the name of the cleartext character called by the program to be encoded;

retrieving from said dictionary the code of said named cleartext character; and making said code available for said named cleartext character to be formatted and expressed.

7. A computer process for formatting binary number codes representing five-bit and eight-bit numbers, to be characters of a character set to be used for common communication, other than handwriting, in any sensible medium, said computer process comprising the steps perform by a computer of:

setting a logical switch, expressed as programmed instruction, to select either five-bit or eight-bit formatting;

retrieving the binary code of the character to be formatted;

retrieving part elements, defined by programmed instructions and selected by design functions, for combination into whole characters, said part elements representing bits or binary ones, representing dots or the like to be used to designate zeros in binary character codes, and being reference symbols used to separate major groups of bits;

assembling said part elements into a virtual image of the whole character symbol representing said binary code of the corresponding cleartext character;

arranging the symbols for binary bits representing the binary number code for said character into two distinct, easily recognized and readable, groups within said character;

separating the bit symbols for the first group, including bits one through four, if present in the binary number code for said character, from the bit symbols for the second group, including bits five through eight, if present in the binary number code for said character; and expressing the separation of said groups of bits by distinctive design of said symbols for binary bits, or by a symbol separating said groups, or by a simple space; and delivering the formatted character image to its destination as defined by the instructions of the program.

* * * * *